United States Patent [19]

Robinson

[11] 4,001,657

[45] Jan. 4, 1977

[54] CAPACITORS HAVING INTEGRAL DISCHARGING MEANS

[75] Inventor: William M. Robinson, New Bedford, Mass.

[73] Assignee: Cornell-Dubilier Electric Corporation, Newark, N.J.

[22] Filed: Apr. 16, 1975

[21] Appl. No.: 568,730

[52] U.S. Cl. ............................ 317/256; 317/12 R
[51] Int. Cl.² ......................................... H01G 4/40
[58] Field of Search ..................... 317/12 R, 256

[56] References Cited

UNITED STATES PATENTS

| | | | |
|---|---|---|---|
| 1,563,754 | 12/1925 | Latour | 317/256 X |
| 3,840,787 | 10/1974 | Grahame | 317/256 |

OTHER PUBLICATIONS

Dummer "Fixed & Variable Capacitors" McGraw Hill N.Y. 1960 p. 89.

Primary Examiner—E. A. Goldberg

[57] ABSTRACT

Wound capacitors have a resistive strip included as an integral part of the capacitor section or roll. End areas of the resistive strip are in physical and electrical contact with the electrode strips, respectively, the rest of the strip discharging electrical energy stored in the capacitor when it is disconnected from a source of power. The portion of the resistive strip between the end areas is electrically insulated from the electrode strips so that current flows along the strip between the end contact areas. In one embodiment, the resistive strip extends about the winding, and in a second embodiment the resistive strip extends transverse to the electrode strips and loops around the edges of the electrode strips and the separating dielectric strips at the end of the capacitor section. If the capacitors are impregnated, the impregnant improves the ability of the resistive strip to withstand the voltage that is applied to the unit and to withstand and dissipate the heat generated in the strip.

16 Claims, 10 Drawing Figures

U.S. Patent  Jan. 4, 1977  4,001,657
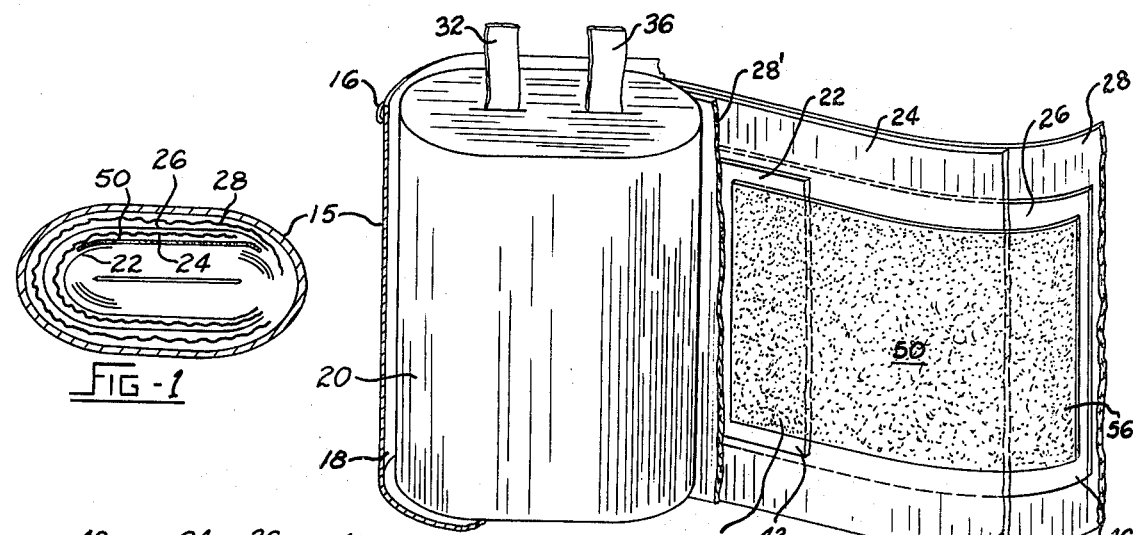
FIG-1
FIG-2
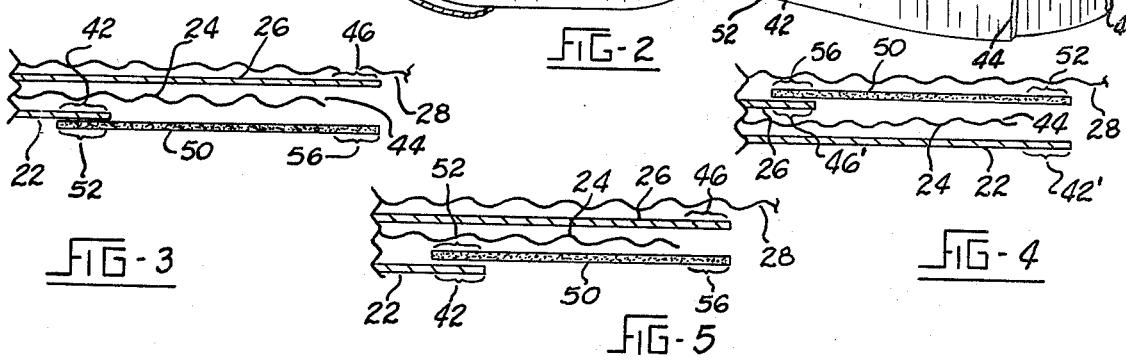
FIG-3
FIG-4
FIG-5
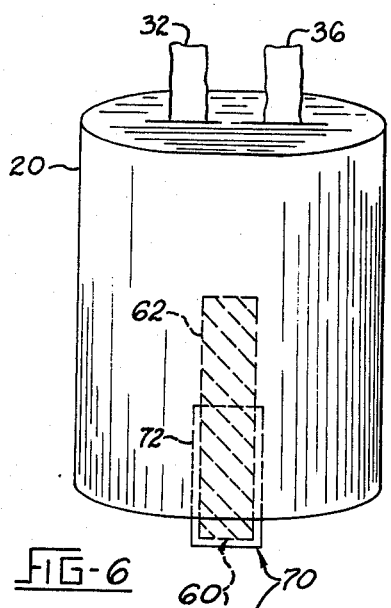
FIG-6
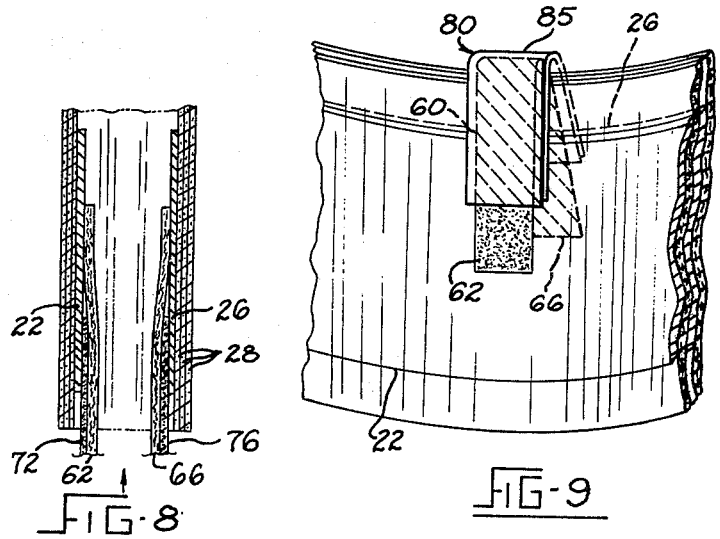
FIG-8
FIG-9
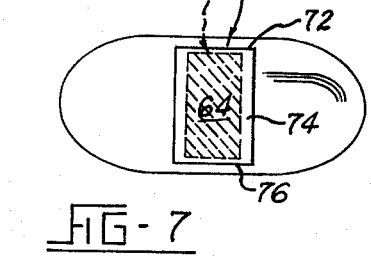
FIG-7
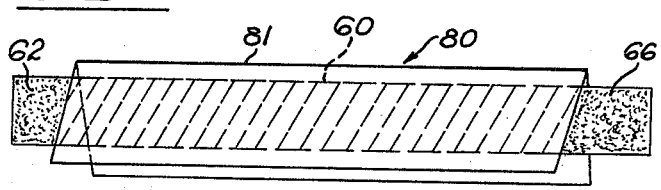
FIG-10

CAPACITORS HAVING INTEGRAL DISCHARGING MEANS

BACKGROUND OF THE INVENTION

This invention relates to electric capacitors or condensers and more particularly to wound capacitors which may be liquid-filled, encased units containing energy discharging means.

When a capacitor is disconnected from a source of power while it was charged, the energy stored in it can present an electrical shock hazard. Consequently, under some circumstances, it is desirable that a discharge resistance be connected across the electrodes of capacitors used in electrical equipment such as fluorescent lighting, high intensity discharge lighting, some appliances and other electrical apparatus. This requirement is for eliminating possible shock hazards from capacitors in such equipment to persons servicing or tampering with the apparatus.

In the past, discrete resistive components such as molded carbon composition resistors or similar parts have been assembled with and electrically connected across the external terminals of the capacitor. Discrete resistors have also been connected internally across the leads which connect the electrodes of encased capacitors to the terminals of the capacitor. This is both a bulky and costly arrangement for discharging such capacitors, in terms of the assembly and of the material utilized. Particularly, in small capacitors incorporating a discharge resistor inside the capacitor case, problems of design arise, related to heat dissipation and to the ability of the resistor to withstand the applied voltage.

SUMMARY OF THE INVENTION

An object of this invention is to provide integral means for discharging electrical energy that may become stored in capacitors. Another object of the invention is to discharge internally the stored electrical energy in a wound capacitor near the outside of the roll. A further object of the invention provides an integral resistive element in which the heat generated in the element is distributed and dissipated from a relatively large surface area.

Accordingly, an illustrative embodiment of this invention includes a winding of a plurality of alternating strips of conducting material and dielectric material and a resistive strip included as an integral part of the capacitor roll in physical and electrical contact at its ends with each conductive strip near the outside of the winding for discharging electrical energy that may be stored in the capacitor when it is disconnected from a source of power. The portion of the resistive strip between its terminal contact areas is electrically insulated from the electrode strips of the capacitor. In the preferred embodiment the electrical contact of the resistive strip to the electrode strips is maintained by pressure of the capacitor case on the roll and by the tension in the roll.

Where the resistive strip extends about the winding it is of distinct advantage to make its length circumferentially significant so that heat generated in the strip is distributed and dissipated from a relatively large surface area and so that the resistor is better able to withstand applied voltage. If the capacitor is impregnated with dielectric material, the heat dissipation from the resistive strip is improved. The dielectric impregnant also improves the ability of the resistive strip to withstand the voltage that is applied to the unit where the resistive strip is of fibrous insulation impregnated with carbon particles, for example.

In an embodiment in which the electrode strips of the capacitor are formed of strips of aluminum foil, the electrodes act as heat sinks for the resistive strip to further distribute and thus dissipate the heat generated in it. Another advantage of the form and location of the resistive element in the disclosed embodiments is that it is quite simple to control the width and/or length of the strip, for adjusting the resistance thereof, as may be needed in the relation to the voltage that is to be applied to the capacitor and in relation to the stored energy to be discharged when the capacitor is disconnected from the electrical source.

In other illustrative embodiments of the invention, the resistive element is formed of an elongated strip of resistive material that is folded across its length with an insulating strip located inside the fold or with an insulating strip folded lengthwise so as to enclose both surfaces of the resistive strip before it is folded across its length. In these embodiments the insulating strips are shorter than the resistive strips so that the ends of the resistive strip are exposed for making electrical contact with the electrode strips of the capacitor. The resistive strip may be formed of two parts joined together as by a conductive clip for avoiding the fold.

BRIEF DESCRIPTION OF THE DRAWING

FIG. 1 is a top view of an opened capacitor that includes an integral resistive discharging strip;

FIG. 2 is a front view of such a capacitor, that is partly unwound with the case partially broken away;

FIGS. 3 – 5 are sectional views of outer portions of capacitor windings having discharging strips in different arrangements;

FIGS. 6 and 7 are front and bottom views, respectively, of another illustrative embodiment of a capacitor with integral discharging means;

FIG. 8 is a sectional view of part of the capacitor of FIGS. 6 and 7;

FIG. 9 is a view of an outer winding of another capacitor discharge means; and

FIG. 10 is a view of a discharge means that may be used in the embodiment of FIG. 9.

DESCRIPTION OF THE PREFERRED EMBODIMENTS

Referring to FIGS. 1 – 3, a capacitor is shown having a winding 20 of a pair of electrodes 22 and 26 and a pair of strips of dielectric material 24 and 28 alternating with the electrodes. Electrodes 22 and 26 are conductive strips as of aluminum foil or, possibly, one or both electrode strips may be of vacuum-deposited metal on a dielectric strip called a metallized electrode. In the drawings strips 22 and 26 are represented as strips of foil. Strips 24 and 28 represent single or multiple thicknesses of paper or any of a variety of plastics or both paper and plastic strips. Terminals 32 and 36 are electrically connected to conducting strips 22 and 26, respectively, by conventional means. Capacitor roll 22 is enclosed within a cavity 18 of a close-fitting case 15 as of sheet metal shown partly broken away in FIG. 2. The side walls and top of capacitor case 15 may be joined by a rolled seam 16, as illustrated. Capacitor roll 20 may be impregnated by a suitable dielectric impregnant, preferably a liquid and having a dielectric constant of 5 to 6, that of the dielectric strips 24 and 28 being 2 to 2.5, which rises to about 5 to 6 when impregnated by the liquid.

As may be seen in FIGS. 2 and 3, dielectric strip 24 is cut at line 44 short of the end of conducting strip 26 and conducting strip 22 is cut shorter, so that end 42 of conducting strip 22 is substantially spaced from end 46 of conducting strip 26 in the roll. A resistive strip 50 is placed in the roll with its marginal end portions 52 and 56 in physical and electrical contact with end portions 42 and 46 of electrode strips 22 and 26, respectively. In the preferred embodiments dielectric strip 28, shown partially cut away, is considerably longer than the other strips and forms several outer layers of the capacitor winding. An inner layer 28' of dielectric strip is also shown partially cut away in FIGS. 2 and 3 for clearly illustrating resistive strip 50 and the electrodes.

A gap equal to a substantial portion of the circumference of capacitor roll 20 is provided between the end 42 of conducting strip 22 and the exposed end 46 of conducting strip 26. This gap is made long enough to avoid an excessive voltage gradient or excessive localized heating, and varies with different sizes of capacitors and their corresponding required discharge resistances. Thin resistive strip 50 is placed so that its marginal end portion 52 is in electrical contact with the marginal end portion 42 of conducting strip 22 and its opposite marginal end portion 56 is in electrical contact with the marginal end portion 46 of conducting strip 26. Substantial areas of resistive strip 50 are thus in electrical contact with marginal end portions 42 and 46, respectively, of conducting strips 22 and 26. The central portion of strip 50 between its terminal contact areas is electrically insulated from electrode 26 by dielectric 24. Conduction in the central portion of resistive strip 50 is along its length, rather than through the thickness of the strip. Heat that is generated in resistive strip 50 during the presence of potential across the electrodes of the capacitor is therefore dissipated from a large surface area of the resistive strip.

Resistive strip 50 is a thin rectangular piece of material of any desired thickness, with a typical thickness being from about 0.0002 inches to about 0.030 inches. The resistive strip may be formed of a conductive paper or of a plastic or other insulating film with a conducting substance such as carbon or graphite dispersed, usually uniformly, throughout the thickness and area of the strip. Alternatively the resistive material may be a coating on a dielectric strip. The resistivity of the resistive strip may be of any suitable value, typically from about 10,000 to 10 million ohms per square which decreases when impregnated, representing a conductance of about $10^{-4}$ to about $10^{-7}$ mhos per square.

A modification of the embodiment of the invention of FIGS. 1–3 is shown in FIG. 4. In the modification, resistive strip 50 may be placed so that terminal areas 52 and 56 thereof are in electrical contact with the outside faces of marginal end portions 42' and 46' of conducting strips 22 and 26. In this embodiment, insulating strip 24 is cut short of the end 44 of dielectric strip 24. Thus, the outside face of the marginal end portion 42' of conducting strip 22 is exposed, as well as the marginal end portion 46' of conducting strip 26 for electric contact to be made to them by resistive strip 50. The central area, or further portion, of resistive strip 50 between its end portions that make contact with the electrodes is insulated from electrode strip 22 by dielectric strip 24. Notably, in this embodiment, no portion of the resistive strip takes the form of a lossy dielectric between any two electrodes.

In another embodiment of the invention, as illustrated in cross-section in FIG. 5, resistive discharge strip 50 is placed between the outside surface of electrode strip 22 and the inside surface of electrode strip 26. Marginal end portions 52 and 56 of the resistive strip are in electrical contact with end portions 42 and 46 of electrode strips 22 and 26, respectively. The central area or further portion of resistive strip 50 which connects its end portions is otherwise insulated from the surface of electrode strip 26 by dielectric strip 24.

If AC voltage is applied across electrode strips 22 and 26 in any of these embodiments, little voltage is developed across the thickness of resistive strip 50 since it is insulated from one or the other of the electrode strips at each point along its length by dielectric strip 24 or 28 that is a low-loss dielectric of vastly higher resistivity. Only one surface of the marginal end portions 52 and 56 of resistive strip 50 is in electrical contact with either of the electrode strips 22 and 26. Since the resistivity of the dielectric strips greatly exceeds that of the resistive discharge strip, most of any AC or ripple voltage that is applied across the electrode strips appears across the thickness of dielectric strips 24 and 28. Only a small portion of AC or ripple voltage appears across the thickness of resistive discharge strip 50 since its resistivity is very low compared to the dielectric strips. Therefore, the heating developed in the resistive strip results almost exclusively from conduction along the strip and not from dielectric loss in the strip.

The resistance of resistive strip 50 that is required is a function of the peak voltage that is applied to the capacitor during use and the capacitance of the capacitor and how quickly and to what voltage it must be discharged after disconnection from the source of voltage. One standard requires that the peak voltage that may exist across the capacitor when it is disconnected from a source of power must be reduced to 50 volts or less within one minute. Therefore, a certain maximum discharge or leakage resistance, not to be exceeded, should be provided by the integral discharge means that is employed.

A typical size of resistive strip 50 such as illustrated in FIGS. 1–5 would have dimensions of about one to 3 or 4 inches in width and about three to 6 or 8 inches in length, varying with the resistivity of the strip and the potential that is applied across it. The central area or further portion of the resistive strip between its marginal end portions or contact areas, would be about two to 3 or 4 inches in length. This further portion is the effective length of the resistive strip since the end portions of the strip are in direct electrical contact with the capacitor electrodes. All of the applied voltage appears along the length of the central area or further portion of the resistive strip. The heat developed in the resistive strip during use of the capacitor is thus developed in this central area or further portion of the resistive strip. Dissipation of the heat and avoidance of an undue localized temperature rise are promoted by an ample area of the central portion of the resistive strip, by its location near or at the exterior of the capacitor winding, and by the high thermal conductivity of the foil electrodes.

FIGS. 6–8 illustrate another embodiment in which a capacitor roll 20 includes an integral resistive discharge strip 60. The capacitor roll includes a pair of electrode terminals 32 and 36 extending out the top. The resistive strip 60 is disposed with its terminal contact areas extending within the capacitor roll in electrical contact with electrode strips 22 and 26 and the central area of further portion of the resistive strip extending partly within and partly outside the roll.

Resistive strip 60 may be considered as comprising end portions 62 and 66 extending within capacitor roll 20 and a central area or further portion 64 between contact areas 62 and 66 extending partially within and partially outside the capacitor roll. As may be seen in the partial sectional view of FIG. 8, end portion 62 of the resistive strip is in electrical contact with electrode 22 and end portion 66 of the resistive strip is in electrical contact with electrode 26 of the capacitor roll. Of course, many additional layers of electrodes 22 and 26 and of dielectric strips 24 and 28 are included within the body of the capacitor roll, although not shown in detail.

In this embodiment, a substantial part of the length of the resistive strip extends outside the capacitor roll at the bottom of the roll. An insulating strip 70 provides insulation between the resistive strip and the bottom of the capacitor case, in addition to usual insulation that may be provided. Further, the end portions 72 and 76 of the insulating strip 70 insulate the further portion or central area 64 of the resistive strip from electrodes 22 and 26 within the capacitor so that only end portions 62 and 66 of the resistive strip are in contact with the electrodes. The separation and insulation of the body or central portion 64 of the resistive strip from the electrode strips except at end contact areas 62 and 66 assures that the heat developed in the resistive strip in operation of the capacitor will be developed in and dissipated from a substantial area of the resistive strip 60. End portions 72 and 76 of the insulating strip are joined by body portion 74 of the insulator which insulates resistive body 64 from the bottom of the capacitor case. The resistive strip 60 of the capacitor of FIGS. 6–8 could just as well be engaged with capacitor roll 20 from the top of the roll so long as it is spaced from electrode terminals 32 and 36 so as not to interfere with them.

FIG. 9 illustrates an outer winding of another embodiment of a capacitor having an integral resistive discharge strip 60. In this embodiment, the resistive strip 60 is folded across its length and inserted into one of the capacitor windings, preferably during the winding operation. As before, end portions 62 and 66 of the resistive strip are in electrical contact with electrode strips 22 and 26, respectively, of the capacitor winding. The resistive strip 60, together with an associated insulating strip 80, may be inserted in the winding from the top as illustrated in FIG. 9 or may be inserted in the winding from the bottom, if desired.

The details of the resistive strip 60 and of the associated insulating strip 80 which may be employed with the capacitor winding in FIG. 9 are illustrated in detail in the drawing of FIG. 10. Insulating strip 80 is folded longitudinally along a line 81 so as to receive and enclose resistive discharge strip 60, leaving end portions 62 and 66 of the resistive strip exposed for electrically contacting the electrodes of the capacitor. Resistive strip 60 is commonly a strip of carbon-loaded or impregnated paper and insulating strip 80 may be a considerably wider, but shorter, strip of kraft paper or the like of any suitable thickness. The width of insulating strip 80 is such that when it is folded along its length it will fully insulate the width of the resistive strip 60 and it will provide the requisite creep distance between the edge of resistive strip 60 and the electrodes that are to be insulated from the central area of the resistive strip. In the illustration of FIG. 10, insulating strip 80 is folded substantially along its center line (line 81) for simplicity and ease of use.

The assembled resistive strip and insulating strip of FIG. 10 is then folded across the length thereof at line 85 as indicated in FIG. 9. This fold is near the middle of the discharge strip member but need not be precisely located. In the embodiment of FIG. 9, the fold line 85 is at an angle to the strip and somewhat displaced from the middle of the strips so that end portions 62 and 66 of the resistive strip 60 are offset from one another lengthwise and are angularly displaced from each other. Further, as illustrated in FIG. 9, the resistive discharge device comprising resistive strip 60 and insulating strip 80 is inserted into one of the windings between insulating strips 24 and 28. End portions or contact areas 62 and 66 are in electrical contact with electrode strips 22 and 26 of the capacitor. The insulating strip 80, therefore, fully insulates the body or further portion of the resistive strip 60 from the electrodes 22 and 26 of the winding across the upper margin of the capacitor winding except at its end portions 62 and 66. Substantially the entire length of the central area 64, or further portion, of the resistive strip is exposed to the voltage appearing on the capacitor.

I claim:

1. An electric capacitor comprising a winding of first and second electrodes and first and second strips of dielectric material separating said first and second electrodes forming a capacitor roll, and a resistive strip included as an integral part of the capacitor roll with first and second terminal portions of the resistive strip in physical and electrical contact with areas of said first and second electrodes, respectively, said resistive strip including a further portion connecting said first and second portions and extending as a loop about a lateral edge portion of at least one convolution of the winding and part of said further portion extending partway across the width of at least one of said electrodes, said capacitor having means electrically insulating said further portion of the resistive strip from the electrodes including means insulating said part of said further portion from the electrode or electrodes across which said part extends so that said resistive strip extends between the electrodes for discharging electrical energy that may be stored in the capacitor when it is disconnected from a source of power.

2. An electric capacitor as in claim 1, wherein the physical and electrical contact of the terminal portions of the resistive strip with the electrodes is maintained at least in part by tension in the roll.

3. An electric capacitor as in claim 2, including an outer case confining the capacitor roll wherein the physical and electrical contact of the terminal portions of the resistive strip with the electrodes is maintained in part by pressure of the case on the roll.

4. An electrical capacitor as in claim 1, including an insulating impregnant filling voids in the capacitor roll and promoting heat dissipation from the resistive strip.

5. An electrical capacitor as in claim 4, wherein the resistive strip is of carbon-impregnated fibrous material that is permeated by the insulating impregnant and thereby having improved ability to withstand applied voltage.

6. An electric capacitor as in claim 1, wherein the portions of the resistive strip in physical and electrical contact with the electrodes are on the same surface of the resistive strip.

7. An electric capacitor as in claim 1, wherein the first and second portions of the resistive strip comprise a pair of strip members each in electrical contact with a different one of said electrodes and said further portion of the resistive strip incorporates an electrical connection between said strip members.

8. An electric capacitor as in claim 1, wherein said further portion of the resistive strip and said terminal portions of the resistive strip comprise one integral continuous strip.

9. An electric capacitor as in claim 1, wherein said terminal portions of the resistive strip are in physical and electrical contact with the first and second electrodes at substantially different locations in the capacitor roll.

10. An electric capacitor as in claim 9, wherein the terminal portions of the resistive strip in electrical contact with the first and second electrodes are spaced apart circumferentially in the capacitor roll.

11. An electric capacitor as in claim 9, wherein the electrical contact of the terminal portions of the resistive strip with the first and second electrodes are transversely spaced apart in the capacitor roll.

12. An electric capacitor as in claim 9, wherein the electrical contact of the terminal portions of the resistive strip with the first and second electrodes are located substantially opposite each other in the capacitor roll.

13. An electric capacitor as in claim 1, wherein said resistive strip includes at least one bend therein outside the capacitor roll, further including insulation additional to said dielectric material overlying the portion of the resistive strip extending outside the capacitor roll.

14. An electric capacitor as in claim 13, wherein the length of said additional insulation is coextensive with the length of said further portion of said resistive strip.

15. An electric capacitor as in claim 1, wherein said further portion of said resistive strip extends partway across each of said electrodes and has at least one bend outside the capacitor roll, said capacitor including insulation additional to said dielectric material coextensive with the length of said further portion of the resistive strip, interposed between each of said electrodes and said resistive strip and extending along the resistive strip outside the winding.

16. An electric capacitor as in claim 15, wherein said additional insulation is a strip of insulating material folded along its length with portions thereof disposed against opposite surfaces of the resistive strip, the width of the insulating strip being related to the width of said resistive strip to provide the requisite creep distance between the edge of said part of the resistive strip and each electrode.

* * * * *